US008902500B2

(12) United States Patent
Wagener et al.

(10) Patent No.: US 8,902,500 B2
(45) Date of Patent: Dec. 2, 2014

(54) OPERATING UNIT FOR OPTICAL IMAGING DEVICES

(75) Inventors: Michael Wagener, Gleichen (DE); Thomas Belkner, Göttingen (DE)

(73) Assignee: Carl Zeiss Microscopy GmbH, Jena (DE)

(*) Notice: Subject to any disclaimer, the term of this patent is extended or adjusted under 35 U.S.C. 154(b) by 1543 days.

(21) Appl. No.: 12/222,754

(22) Filed: Aug. 15, 2008

(65) Prior Publication Data
US 2009/0052022 A1 Feb. 26, 2009

Related U.S. Application Data

(63) Continuation-in-part of application No. PCT/EP2007/001643, filed on Feb. 27, 2007.

(30) Foreign Application Priority Data

Feb. 28, 2006 (DE) .......................... 10 2006 010 104

(51) Int. Cl.
*G02B 21/00* (2006.01)
*G02B 21/36* (2006.01)
*G02B 21/24* (2006.01)

(52) U.S. Cl.
CPC .............. *G02B 21/365* (2013.01); *G02B 21/24* (2013.01); *G02B 21/368* (2013.01)
USPC ........................................................ 359/362

(58) Field of Classification Search
None
See application file for complete search history.

(56) References Cited

U.S. PATENT DOCUMENTS

| 7,262,907 B2 | 8/2007 | Rentzsch |
| 2002/0015223 A1* | 2/2002 | Mecham et al. ............. 359/368 |
| 2003/0021017 A1 | 1/2003 | Eijsackers et al. |
| 2003/0181803 A1 | 9/2003 | Sander |
| 2005/0111086 A1 | 5/2005 | Knoblich et al. |
| 2007/0159686 A1 | 7/2007 | Fiedler et al. |
| 2007/0177258 A1 | 8/2007 | Eijsackers et al. |

OTHER PUBLICATIONS

Carl Zeiss Jena, "LSM 510 Laser Scanning Microscope", Prospect Carl Zeiss Jena, 2003, XP002321662, System Overview, pp. 20 to 21.
Translation of the Annex of the Written Notice of the International Search Authority (Form PCT/ISA/237), Sep. 2, 2008 (translation into English).

* cited by examiner

*Primary Examiner* — D. Chapel
(74) *Attorney, Agent, or Firm* — Walter Ottesen P.A.

(57) ABSTRACT

An operator-controlled device for optical imaging systems has modular components for inputting settings relating to the imaging of an object to be observed. The operator-controlled device further includes a display device for pregiven desired adjustment values and/or a display device for the actual adjustment values instantaneously achieved on the imaging system and transmitting devices for transmitting signals corresponding to the desired or actual adjustment values between the operator-controlled device and the imaging system. The operator-controlled device includes: at least one modular component for inputting desired adjustment values, a base component for accommodating one or more of the modular components and arrangements for manually and mechanically connecting the modular components to the base component and for manually separating the modular components from the base component.

20 Claims, 4 Drawing Sheets

OPERATING UNIT FOR OPTICAL IMAGING DEVICES

CROSS REFERENCE TO RELATED APPLICATIONS

This application is a continuation-in-part application of international patent application no. PCT/EP 2007/001643, filed Feb. 27, 2007, designating the United States and claiming priority from German application 10 2006 010 104.9, filed Feb. 28, 2006, the entire contents of which are incorporated herein by reference.

FIELD OF THE INVENTION

The invention relates to an operator-controlled device for optical imaging systems, especially for microscopes, which are equipped with operator-controlled elements for inputting settings which concern the imaging of an object to be viewed.

BACKGROUND OF THE INVENTION

The operator-controlled devices for optical imaging systems known from the state of the art can be subdivided into essentially two function groups.

For example, operator-controlled consoles having operator-controlled elements belong to a first function group. From these operator-controlled consoles, control commands, which activate motoric functions, are transmitted to the imaging system, for example, a microscope. Such operator-controlled consoles can, in addition, be equipped with means for displaying the controllable functions and the set values achieved in each case. Furthermore, operator-controlled elements are also disposed on the imaging systems themselves from which, at least in part, the same functions can be activated so that operator control is possible directly on the imaging system, but, as required, also separately therefrom.

It is disadvantageous here that the configuration of the operator-controlled elements as well as their arrangement on the operator-controlled console do not correspond to the configuration and arrangement of the operator-controlled elements which are positioned directly on the imaging system. Thus, for example, a joystick is present on the operator console for focusing the beam path of a microscope objective onto an object to be viewed; whereas, on the microscope, a horizontally-arranged focusing drive having rotation transducers is provided.

A second function group includes separate operator-controlled devices wherein, for example, the focusing drive control and stage drive control are modeled after the rotation transducers and sensitively operable operator-controlled adjusting elements on an imaging system as, for example, in microscopes manufactured by Leica and Nikon. However, these operator-controlled devices do not supply any feedback as to whether a set value, which is pregiven from the operator-controlled device, was actually adjusted on the microscope. Disadvantageously, it is therefore necessary that the operator during the work with such a microscope must keep an eye on the operator-controlled device (for inputting the set values) as well as the microscope (for controlling the set values). Furthermore, the apparatus complexity is relatively great because operator-controlled elements are there in duplicate, namely, on the imaging system itself and on the operator-controlled device.

Furthermore, the operator does not have the possibility, in accordance with his own judgment, to undertake adjusting options, which are selected with the same operator-controlled elements, either directly on the imaging system or from the operator-controlled device and to change this selection depending upon the object viewing task to be solved or to variably adapt the selection to his wishes.

SUMMARY OF THE INVENTION

Starting from this state of the art, the object of the invention is based upon providing an operator-controlled device for optical imaging systems of the above-mentioned type to make possible a more flexible use of the imaging system for the operator.

According to the invention, this object is realized with an operator-controlled device of the above-mentioned type which, in addition to the operator-controlled elements for inputting the adjustments, further includes:
- display means for pregiven desired set values; and/or,
- display means for the instantaneously achieved actual set values on the imaging system;
- means for transmitting the signals, which correspond to the desired set values and actual set values, between the operator-controlled device and the imaging system;
- at least one modular component having at least one operator-controlled element for inputting desired set values;
- a base component, which is configured for accommodating one or several such modular components; and,
- devices for manually coupling modular components to the base component and for manually separating modular components from the base component.

In this way, it is possible for the operator to so assemble the operator-controlled device that the adjustments can be performed from this operator-controlled device which the operator desires to undertake from the operator-controlled device and as it is optimal for the solution of the particular given task. Assembly and composition of the operator-controlled device can be undertaken in correspondence to his judgment and his desires.

In the special case, the base component can be equipped with modular components which make it possible to control all functions of the imaging system from the operator-controlled device so that the imaging system can be operated from a greater distance. This includes also the possibility of setting up the imaging system and the operator-controlled device in separate rooms insofar as this is purposeful for observing specific objects or is required.

Operator-controlled elements are provided on the modular components which is especially advantageous for adjusting:
- the intensity of the illuminating light which is directed onto the viewed object and which emanates from an illuminating device; or,
- the position of the object relative to the imaging optic at least in the coordinates X, Y and/or Z of a coordinate system X, Y, Z.

It is likewise of advantage when display means are provided on the modular components or on the base component of the operator-controlled device according to the invention for displaying the instantaneous settings relating to the functions of the imaging system, such as for displaying the instantaneous focus position, the instantaneous illuminating intensity or the achieved actual position during the positioning of the object in the coordinates X, Y and/or Z relative to the imaging optic. Usually, the coordinate direction Z is aligned in the direction of the optical axis of the imaging optic.

The signals, which correspond to the desired set values and emanate from the operator-controlled device, are transmitted to a drive circuit wherein these signals are converted into position commands for motoric drives, for example: for the drives which are connected to the object table on which the object to be imaged is placed; for focusing drives which are coupled to lenses or lens groups of the imaging optic; or, for drives for actuating diaphragms or shutters in the illuminating beam path for the purpose of influencing illumination intensity.

In an especially advantageous embodiment, the base component of the operator-controlled device of the invention includes plug-in positions for the modular components. Each modular component can be inserted into one of the plug-in positions.

With respect to the above, it can be provided that no fixed assignment of the modular components is pregiven to the individual plug-in positions; that is, each of the modular components can be inserted into any of the just then free plug-in positions and from there carry out its function.

Alternatively to the above, plug-in positions on the base component can be assigned to the individual modular components, that is, the plug-in position for a specific modular component is not freely selectable; instead, each plug-in position defines a relationship to the function of a specific modular component assigned thereto.

The freely selectable or fixed pregiven assignment of the modular components to the plug-in positions can be realized by means of mechanical, form-tight plug-in connections. The form of the plug-in connection permits either the insertion of any desired modular component or the insertion of a specific modular component having a defined function.

In an alternate embodiment of the invention, the mechanical, form-tight plug-in connections are combined with electrically conductive plug-in connections for signal transmission from the modular components to the base component and vice versa. The signals, which are transmitted from the modular components to the base component, correspond to the desired set values and the signals, which are transmitted in the reverse direction, correspond to the instantaneous actual set values.

In this case, there is furthermore a signal connection between the base component and the imaging system. The signals, which are triggered with the actuation of the adjusting element on the particular modular component, first reach the base component via the electrically conducting plug-in connection and are from there transmitted to the imaging system. Likewise, the signals, which correspond to the instantaneous actual set values, are first transmitted from the imaging system to the base component and then reach the particular modular component via the plug-in connection and are there displayed insofar as the modular component is equipped with a display device.

Departing from the above, it is conceivable that direct signal connections exist between each of the modular components and the imaging system so that the signal paths, which run via the base component, can be omitted. In this case, only mechanical connections are then required between the modular components and the base component which can, for example, be configured as threaded fastener connections.

It is especially advantageous when the modular components are so configured that they can each be so inserted in dependence upon a left-hand or right-hand usage that an ergonomically favorable operator manipulation is possible. For example, if the modular component is equipped with a rotation transducer, then it can be provided that the modular component is so insertable that the rotation transducer can be grasped for the left hander from the left side and for the right hander from the right side of the base component.

Furthermore, it has been proven effective when the operator-controlled device is equipped with a touch screen with which the input of set values can take place via touching the display surface. The touch screen functions as a display device as well as an input element.

Likewise as an option, a unit for outputting differentiated acoustic signals can be present on the base component of the operator-controlled device and/or also on at least one of the modular components. The acoustic signals are associated with the set values. Accordingly, the acoustic signals supply the operator, for example, with information as to whether there is a drop below a specific set value or whether the set value is exceeded or whether the set value was reached exactly.

Especially advantageous for the use of imaging systems of the kind described is when not only the base component has plug-in positions for the modular components but also the imaging system. Then it is possible to selectively insert the modular components onto the base component or onto the imaging system and the operator can decide for the purpose of the particular task to be solved which settings should be undertaken from a larger distance, that is, remote from the imaging system or directly on the imaging system.

The operator-controlled elements on the modular components can be in the form of keys, rotation transducers, slide controllers or even in the form of scroll wheels.

Modular components and operator-controlled elements can be present in such a number and configuration that the manipulation and display is possible for all motoric and coded components of the imaging system.

BRIEF DESCRIPTION OF THE DRAWINGS

The invention will now be explained in greater detail with reference to the drawings wherein.

DESCRIPTION OF THE PREFERRED EMBODIMENTS OF THE INVENTION

Figure 1:
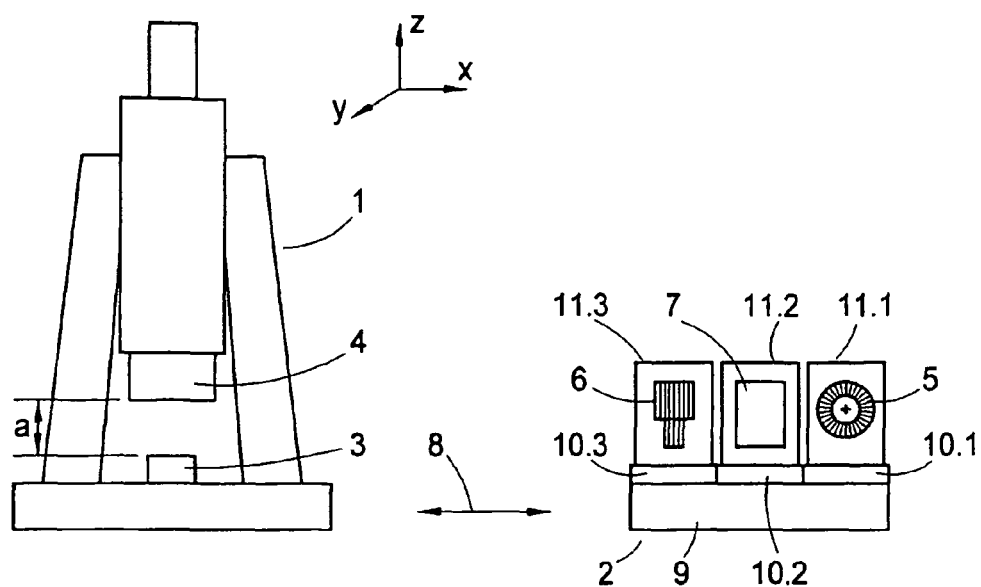
FIG. 1 shows a simplified schematic of the essential configuration of the operator-controlled device of the invention with the operator-controlled device having modular components and being apart from the imaging system.

In FIG. 1, an imaging system in the form of a microscope 1 as well as a corresponding operator-controlled device 2 are shown. The schematic is simplified and serves to explain the functional principle.

The operator-controlled device 2 is provided for inputting adjustments which concern the imaging or viewing of an object 3. Such adjustments are to be undertaken at the microscope 1, for example, for focusing the image, changing the position of the object 3 relative to the objective 4 of the microscope 1 or also for adjusting the illuminating light emanating from an illuminating unit (not shown) and directed onto the object 3.

Operator-controlled elements are provided on the operator-controlled device 2 with which these adjustments can be inputted. Accordingly, for example, a rotation transducer 5 is provided with which the distance (a) between the object 3 and the objective 4 can be increased or decreased in the coordinate Z, that is, in the direction of the optical axis of the objective 4 and thereby the focus position relative to the object 3 can be influenced. A position drive 6 includes two coaxially-journalled manually operated rotation transducers. With this position drive 6, the positioning of the object 3 relative to the objective 4 can be controlled in the coordinates X and Y.

Furthermore, a touch screen 7 is provided which is suitable, for example, to display the adjustable and adjusted brightness values or illumination intensities and the change or correction of these values by touching the display surface.

The touch screen 7 can, for example, be pivotally mounted so that it can be tilted by the viewer and therewith be manipulated and viewed in an ergonomically favorable position.

A signal connection 8 ensures that signals, which correspond to the respective pregiven set values, are transmitted from the operator-controlled device 2 to the microscope 1 or that signals, which correspond to the obtained set values, respectively, and are, for example, intended to be displayed on the touch screen 7, are transmitted from the microscope 1 to the operator-controlled device 2. This signal connection 8 is likewise indicated symbolically and can be configured in the form of a wireless connection, hardwire connection or even as a combination of both of these connecting types.

According to the invention, the operator-controlled device 2 is configured to be modular, that is, the device comprises a base component 9 which is equipped with plug-in positions 10.1, 10.2 and 10.3.

The rotation transducer 5, the touch screen 7 and the positioning drive 6 are arranged on modular components 11.1, 11.2 and 11.3, respectively, which can be inserted into the plug-in positions 10.1, 10.2 and 10.3. The base component 9 on the one hand and the modular components 11.1, 11.2 and 11.3 on the other hand are equipped with plug-in connections which correspond form-tightly with each other and which assume the holding function for the modular components 11.1, 11.2 and 11.3 on the base component 9.

In addition, electrically conductive plug-in connections (FIG. 7) are provided which ensure the signal transmission from the modular components 11.1, 11.2 and 11.3 to the base component 9 and vice versa from the base component 9 to the modular components 11.1, 11.2 and 11.3.

Figure 7:
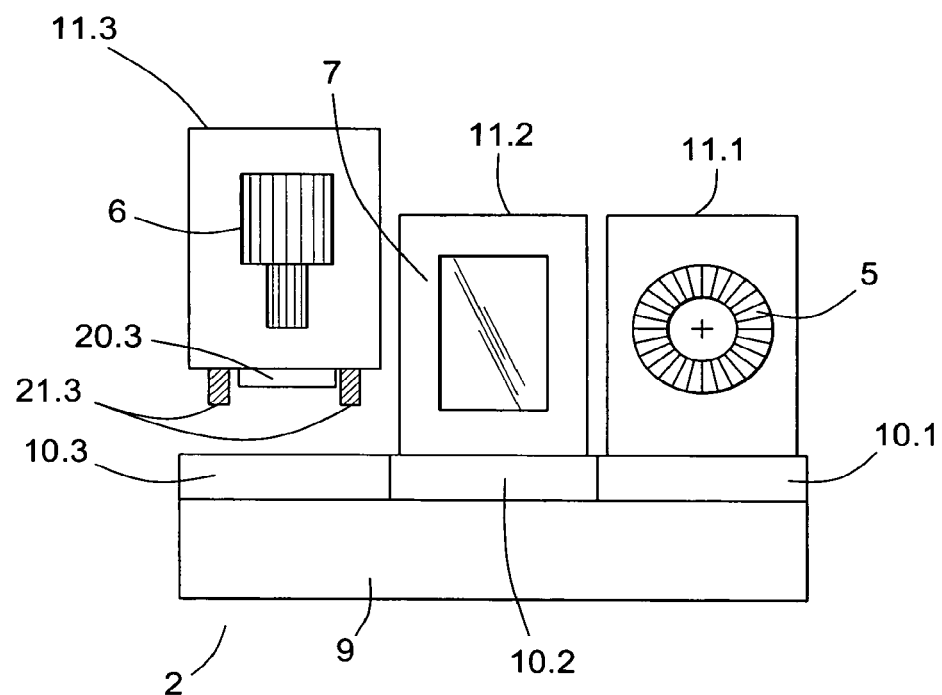
FIG. 7 shows an enlarged view of the operator-controlled device showing how a modular component is electrically and mechanically connected to the base component; and, FIG. 8 is a schematic showing transmitting devices and receiving devices to facilitate a wireless transmission between each of the modular components and the imaging system.

Referring now to FIG. 7, the operator-controlled device 2 is shown enlarged. For modular component 11.3, an arrangement 20.3 is shown by way of example for manually coupling and manually decoupling the modular component 11.3. Arrangement 20.3 can be an electrical plug which is assigned to a socket at the corresponding plug-in position 10.3. The other modular components (11.1, 11.2) can also have such arrangements. Furthermore, the modular components include means 21.3 for mechanically connecting the modular component to the base component 9. These means could, for example, be conventional threaded fasteners which are tightened with a screwdriver after placing the modular component on the base component 9, that is, at the corresponding plug-in location 10.3 in order to mechanically connect both components to each other.

In this way, it is achieved that the set commands, which are triggered by means of the rotation transducer 5, the position drive 6 or the touch screen 7, first reach the base component drive 9 via the electrically conductive plug-in connections and from there are transmitted further via the signal connection 8 to the microscope 1 or to the corresponding drive circuit which is integrated into the microscope 1 and connected to an assigned position drive.

With this, it is advantageously achieved that the operator can use the operator-controlled device 2 not only separately from the microscope 1, but that the operator-controlled device 2 can be so configured in dependence upon the viewing task to be solved with the microscope 1 that an optimal manipulation is possible. Accordingly, the operator can selectively insert only the modular component 11.1 having the rotation transducer 5 on the base component 9 for influencing the distance (a) and use this configuration as an operator-controlled device or the operator can select another configuration.

It is conceivable that the modular components 11.1, 11.2 and 11.3 are fixedly assigned to the plug-in positions 10.1, 10.2 and 10.3 or, alternatively, that the plug-in positions 10.1, 10.2 and 10.3 are freely selectable for each of these modular components 11.1, 11.2 and 11.3. The latter, however, would require that the electrically conductive and mechanical plug-in connections are so configured that this universal insertability is ensured.

Figure 2:
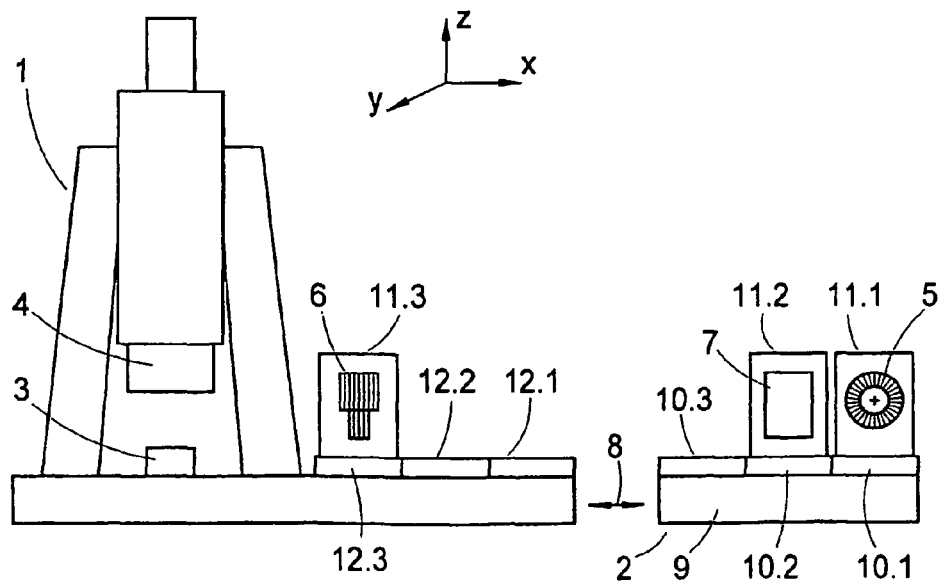
FIG. 2 shows the basic configuration of FIG. 1 but in a preferred embodiment wherein the modular components are selectively arranged on the base component of the operator-controlled device or on the imaging system.

In an advantageous embodiment, which is likewise shown in FIG. 2 in principle, the microscope 1 has at least one plug-in position which is suitable for accommodating one of the modular components 11.1, 11.2 and 11.3.

In the same manner as the plug-in positions 10.1, 10.2 and 10.3 on the base component 9 of the operator-controlled device 2, three plug-in positions 12.1, 12.2 and 12.3 are shown in FIG. 2 on the microscope 1 for accommodating the modular components 11.1, 11.2 and 11.3. The operator of the microscope 1 can, in this case, decide whether he inserts one or several of the modular components 11.1, 11.2 and 11.3 onto the base component 9 and from there inputs the settings or whether he inserts one or several of the modular components 11.1, 11.2 and 11.3 into the plug-in positions 12.1, 12.2 and 12.3 on the microscope 1 and undertakes the settings directly on the microscope 1.

FIG. 2 shows only by way of example that the modular components 11.1 and 11.2 are inserted on the base component 9 and therefore are assigned to the operator-controlled device 2 whereas the modular component 11.3 is inserted on a plug-in position 12.3 on the microscope 1.

FIGS. 3, 4, 5 and 6 show respective detailed embodiment variations for the operator-controlled device 2.

Figure 3:
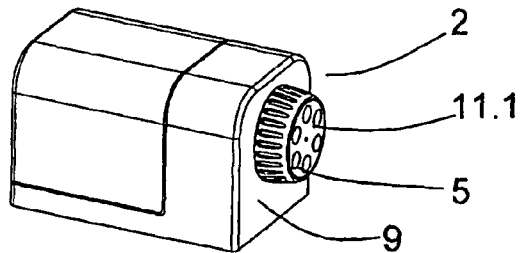
FIG. 3 shows an operator-controlled device including a base component and a modular component for controlling a positioning movement in the direction of the coordinate Z.

Thus, in FIG. 3, a base body 9, which is configured to have an L-shape, is shown on which the modular component 11.1 having the rotation transducer 5 is inserted.

Figure 4:
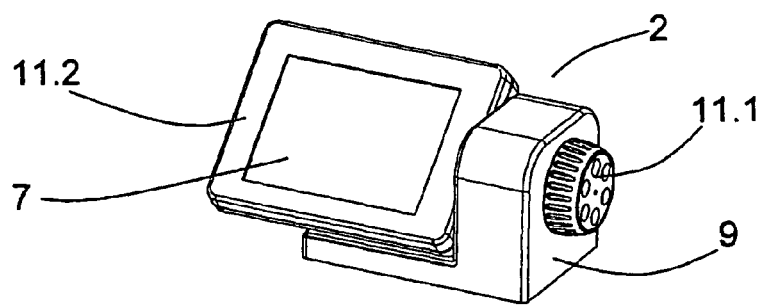
FIG. 4 shows an operator-controlled device according to FIG. 3 but additionally equipped with a modular component having a touch screen.

FIG. 4, in turn, shows the L-shaped base body 9 with a modular component 11.1 and a modular component 11.2 having the touch screen 7. The modular component 11.2 is also inserted on the base body 9.

Figure 5:
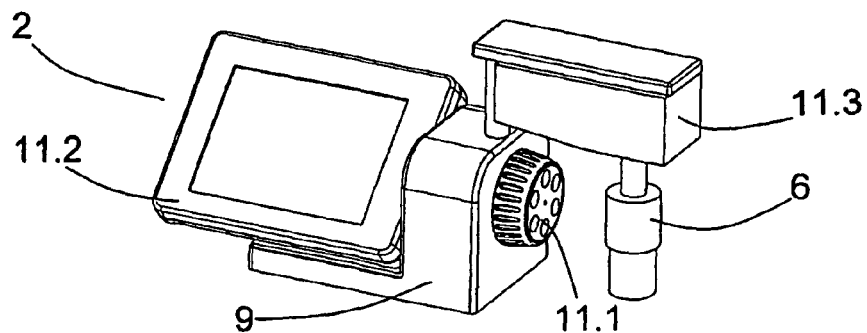
FIG. 5 shows an operator-controlled device according to FIG. 4 but additionally equipped with a modular component for adjusting the focus position which here is for manipulation from the right.

In FIG. 5, an embodiment of the operator-controlled device 2 is shown wherein the base component 9 is provided with the modular component 11.1, the modular component 11.2 and additionally the modular component 11.3. The modular component 11.3 has the position drive 6 as shown.

Figure 6:
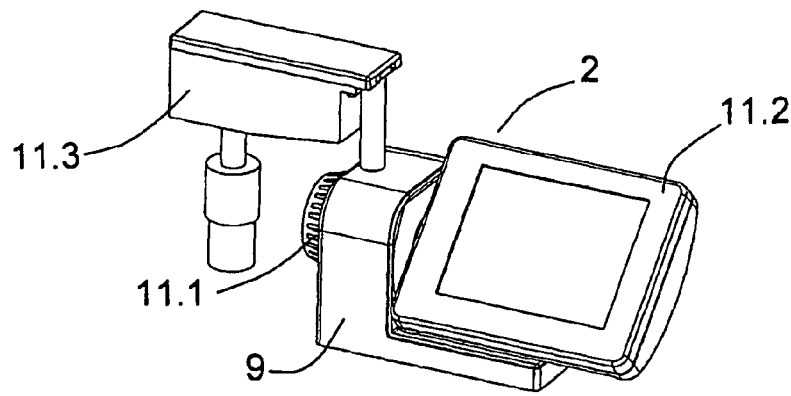
FIG. 6 shows the operator-controlled device of FIG. 5 but for manipulation from the left.

The operator-controlled device of FIG. 5 is designed for the manipulation from the right. In comparison thereto, FIG. 6 shows an operator-controlled device 2 which is designed for manipulation from the left. The selection possibility between manipulability favorable from the right or the left is achieved in that the plug-in positions 10.1, 10.2 and 10.3 on the base component 9 of the operator-controlled device 2 or the plug-in positions 12.1, 12.2 and 12.3 on the microscope 1 are so configured that the modular components 11.1, 11.2 and 11.3 can be arranged for the operation from the right as well as from the left.

Figure 8:
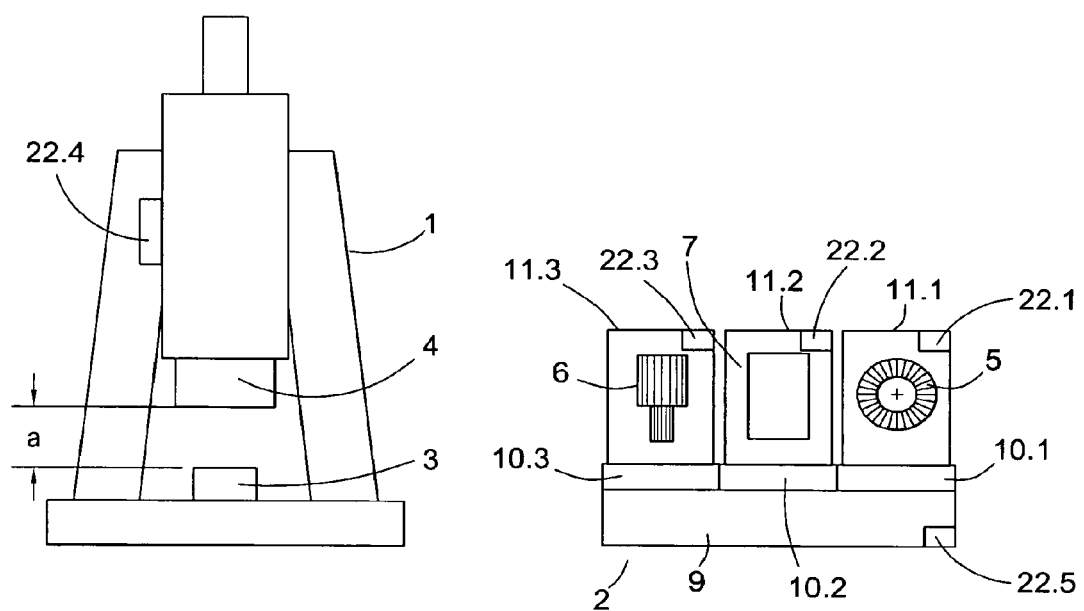

According to another embodiment of the invention, transmitting devices (22.1, 22.2, 22.3) and receiving devices 22.4 are provided for wireless signal transmission between each of the modular components (11.1, 11.2, 11.3) and the imaging system as shown in FIG. 8.

As another option, a unit for outputting differentiated acoustic signals can be provided on the base component 9 of the operator-controlled device 2 and/or also on at least one of the modular components. The acoustic signals are associated with the set values. Accordingly, the acoustic signals supply the operator, for example, with information as to whether there is a drop below a specific set value or whether the set value is exceeded or whether the set value was reached exactly. The acoustic device can be schematically represented in the same manner as the transmitting devices and the receiving devices shown in FIG. 8. The acoustic device on the base component 9 is shown by way of example in FIG. 8 by the element 22.5.

It is understood that the foregoing description is that of the preferred embodiments of the invention and that various changes and modifications may be made thereto without departing from the spirit and scope of the invention as defined in the appended claims.

REFERENCE LIST

1 Microscope
2 Operator-controlled device
3 Object
4 Objective
5 Rotation transducer
6 Position drive
7 Touch screen
8 Signal connection
9 Base component
10.1, 10.2, 10.3 Plug-in positions
11.1, 11.2, 11.3 Modular component
12.1, 12.2, 12.3 Plug-in positions,
20.3 Electrical plug
21.3 Threaded fasteners
22.1, 22.2, 22.3 Transmitting devices
22.4 Receiving devices
22.5 Acoustic device
a Distance

What is claimed is:

1. An operator-controlled device for an optical imaging system, the operator-controlled device comprising:
a plurality of modular components for inputting settings for imaging an object with said optical imaging system;
means for transmitting signals indicative of said settings, between the operator-controlled device and said optical imaging system;
said operator-controlled device further including:
at least one of said modular components being provided to input desired set values;
a base component adapted to receive said modular component thereon; and,
interface means for manually and mechanically connecting said modular component directly to said base component and for manually separating said modular component from said base component.

2. The operator-controlled device of claim 1, wherein said modular component is one of a plurality of modular components; and, said modular components are provided for adjusting at least one of:
the intensity of the illuminating light which emanates from an illuminating unit and is directed onto the object to be imaged; and,
the position of the object relative to the imaging optic at least in one of the coordinates of an X, Y and Z coordinate system.

3. The operator-controlled device of claim 2, wherein display means are provided on one of said modular components for displaying at least one the actual position of the object relative to the imaging objective; and, the instantaneous illuminating intensity.

4. The operator-controlled device of claim 2, wherein:
said base component has several plug-in positions for respective ones of said modular components; and,
said modular components are insertable into said plug-in positions and said modular components and said plug-in positions are allocated to each other with respect to specific adjustments.

5. The operator-controlled device of claim 4, wherein said plug-in positions include means for mechanically connecting the modular components to said base component; and, said transmitting means including transmitting devices and receiving devices for wireless signal transmission between each of said modular components and said optical imaging system; or, said transmitting means including cable connections for wire connected signal transmission between each of the modular components and said optical imaging system.

6. The operator-controlled device of claim 4, wherein said plug-in positions have means for mechanically connecting said modular components to said base component; and, said operator-controlled device further comprises:
electrically conducting plug-in connections for transmitting signals between the respective modular components and said base component; and,
transmitting devices and receiving devices for wireless signal transmission between said base component and said optical imaging system; or,
cable connections for wire connected signal transmission between said base component and said optical imaging system.

7. The operator-controlled device of claim 4, wherein said modular components are selectively insertable on said base component for right handed persons and left handed persons for facilitating ergonomically favorable manipulation.

8. The operator-controlled device of claim 4, further comprising at least one touch screen, which serves as a display device as well as an input element whereat the input of set values is possible by touching a display surface.

9. The operator-controlled device of claim 4, further comprising a unit for outputting acoustic signals disposed on said base component; or, on at least one of said modular components; and, said signals being referred to the set values on said optical imaging system.

10. The operator-controlled device of claim 9, wherein the acoustic signals-relate to a drop below the desired set values, exceeding said desired set values or exactly reaching said desired set values.

11. The operator-controlled device of claim 2, wherein said base component as well as said optical imaging system have plug-in positions for at least one of said modular components; and,
  said modular components are insertable selectively at said plug-in positions on said base component or on said plug-in positions on said optical imaging system.

12. The operator-controlled device of claim 2, wherein said modular components are configured in the form of keys, rotation transducers, slide controllers or scroll wheels.

13. The operator-controlled device of claim 2, wherein said modular components are flush with said base component when said modular components are mechanically connected to said base component.

14. The operator-controlled device of claim 2, wherein said interface means includes means for electrically connecting said modular components to said base component.

15. The operator-controlled device of claim 14, wherein said means for electrically connecting said modular components to said base component includes an electrical plug and socket.

16. The operator-controlled device of claim 1, wherein said imaging system is a microscope.

17. An operator-controlled device for an optical imaging system, the operator-controlled device comprising:
  a plurality of modular components for inputting settings for imaging an object with said optical imaging system;
  means for transmitting signals indicative of said settings, between the operator-controlled device and said optical imaging system;
  said operator-controlled device further including:
  at least one of said modular components being provided to input desired set values;
    a base component adapted to receive said modular components thereon and said base component being separate from and disposed in spaced relationship to said optical imaging system; and,
    interface means for manually and mechanically connecting said modular components directly to said base component and for manually separating said modular components from said base component.

18. The operator-controlled device of claim 17, wherein said interface means includes means for electrically connecting said modular components to said base component.

19. The operator-controlled device of claim 18, wherein said means for electrically connecting said modular components to said base component includes an electrical plug and socket.

20. The operator-controlled device of claim 17, wherein each of said modular components is flush with said base component when the modular component is mechanically connected to said base component.

* * * * *